United States Patent
Wang et al.

(10) Patent No.: US 10,798,647 B2
(45) Date of Patent: Oct. 6, 2020

(54) NETWORK SLICE SELECTION

(71) Applicant: Apple Inc., Cupertino, CA (US)

(72) Inventors: Haining Wang, Beijing (CN); Huarui Liang, Beijing (CN); Haijing Hu, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/379,170

(22) Filed: Apr. 9, 2019

(65) Prior Publication Data

US 2019/0239156 A1    Aug. 1, 2019

Related U.S. Application Data

(63) Continuation of application No. 15/128,622, filed as application No. PCT/CN2016/088320 on Jul. 4, 2016, now Pat. No. 10,278,123.

(51) Int. Cl.
*H04B 7/00* (2006.01)
*H04W 48/18* (2009.01)
(Continued)

(52) U.S. Cl.
CPC ............. *H04W 48/18* (2013.01); *H04W 8/20* (2013.01); *H04W 48/10* (2013.01); *H04W 48/12* (2013.01);
(Continued)

(58) Field of Classification Search
CPC ..... H04W 48/10; H04W 48/12; H04W 48/18; H04W 8/20
(Continued)

(56) References Cited

U.S. PATENT DOCUMENTS 7,193,985 B1   3/2007 Lewis
7,471,655 B2   12/2008 Gallagher
(Continued)

FOREIGN PATENT DOCUMENTS

CN    103650437 A    3/2014
CN    105516312 A    4/2016
(Continued)

OTHER PUBLICATIONS

Hu, et al., "A Joint Utility Optimization Based Virtual AP and Network Slice Selection Scheme for SDWNs"; 2015 10th International Conference on Communications and Networking in China (China Com); Aug. 15-17, 2015; 6 pages.
(Continued)

*Primary Examiner* — Dmitry Levitan
(74) *Attorney, Agent, or Firm* — Kowert, Hood, Munyon, Rankin & Goetzel, P.C.

(57) ABSTRACT

This disclosure relates to techniques for network slice selection. A network slice selection function of a cellular network may receive a network slice selection request from a radio access network node of the cellular network. The network slice selection request may be received by the radio access network node from a wireless device. A core network slice (and possibly a radio access network slice) of the cellular network may be selected for the service request. A network slice selection response may be provided to the radio access network node, indicating a control plane entry point address for the selected core network slice. The selected radio network slice may also be indicated in the network slice selection response.

20 Claims, 10 Drawing Sheets

(51) Int. Cl.
| | |
|---|---|
| *H04W 48/10* | (2009.01) |
| *H04W 48/12* | (2009.01) |
| *H04W 76/12* | (2018.01) |
| *H04W 76/11* | (2018.01) |
| *H04W 8/20* | (2009.01) |
| *H04W 48/16* | (2009.01) |
| *H04W 16/24* | (2009.01) |

(52) U.S. Cl.
CPC ............ *H04W 48/16* (2013.01); *H04W 76/11* (2018.02); *H04W 76/12* (2018.02); *H04W 16/24* (2013.01)

(58) Field of Classification Search
USPC ................ 370/310, 328, 338, 341, 349, 465
See application file for complete search history.

(56) References Cited

U.S. PATENT DOCUMENTS

| | | | |
|---|---|---|---|
| 9,413,673 | B2 | 8/2016 | Stanwood et al. |
| 9,961,713 | B2 | 5/2018 | Salkintzis |
| 9,967,801 | B2 | 5/2018 | Byun |
| 2004/0179526 | A1 | 9/2004 | Cypher |
| 2014/0099955 | A1 | 4/2014 | Nukala |
| 2014/0086177 | A1 | 5/2014 | Adjakple et al. |
| 2017/0331785 | A1 | 11/2017 | Xu |
| 2017/0332212 | A1 | 11/2017 | Gage |
| 2017/0332282 | A1 | 11/2017 | Dao |
| 2017/0339688 | A1* | 11/2017 | Singh ................... H04W 76/11 |
| 2018/0124660 | A1 | 5/2018 | Zhang |
| 2018/0352501 | A1* | 12/2018 | Zhang .................. H04W 48/18 |
| 2019/0174321 | A1* | 6/2019 | Sun ....................... H04W 16/02 |

FOREIGN PATENT DOCUMENTS

| | | |
|---|---|---|
| JP | A 2013-537725 | 10/2013 |
| WO | WO 2017/097169 A1 | 6/2017 |
| WO | WO 2017/173404 A1 | 10/2017 |

OTHER PUBLICATIONS

Shimojo et al.; "Future Core Network for the 5G Era"; NTT Docomo Technical Journal; No. 4, vol. 17; Apr. 30, 2016.
International Search Report and Written Opinion, Application No. PCT/CN2016/088320, dated Apr. 7, 2017, 11 pages.
Huawei et al.; "UE Slice Association/Overload Control Procedure"; 3GPP TSG SA WG2 Meeting #115, S2-163161; May 23-27, 2016; Nanjing, China; pp. 1-9.
3GPP TR 23.799 V0.5.0 (May 2016) ; Technical Report; 3rd Generation Partnership Project; Technical Specification Group Services and System Aspects; Study on Architecture for Next Generation System (Release 14), May 2016; 179 pages.
CATT; "Network slicing architecture and slice selection mechanism": SA WG2 Meeting #115, S2-162652; May 23-27, 2016; Nanjing, China; 3 pages.
6G Electronics; "Initial network slice instance selection (update of solution 1.3)"; SA WG2 Meeting #115 S2-162627; May 23-27, 2016; Nanjing, China; 3 pages.
Examination report No. 1 for standard patent application, Australian Application No. 2016379814, dated May 31, 2018, 6 pages.
ZTE; "Consideration on RAN architecture impacts of network slicing"; 3GPP TSG-RAN WG2#93bis; Apr. 15, 2016; R2-162627; eight pages.
Office Action, Japanese Patent Application No. 2017-533848, dated Sep. 18, 2018, six pages.
Examination report No. 2 for standard patent application, Australian Application No. 2016379814, dated Sep. 24, 2018, five pages.
Examination Report No. 4, Application No. 2016379814, dated Jan. 15, 2019, 5 pages.
Nokia, Alcatel-Lucent Shanghai Bell, "RAN Selection of CN Entity based on Network Slicing," 3GPP TSG-RAN WG3 #92, 3GPP, May 27, 2016, R3-161357, four pages.
China Mobile, Sprint, NEC, CATT, CATR, Deutsche Telekom, Ericsson, "Network Slicing Architecture and High-Level Function Definition," 3GPP TSG-SA WG2 #115, 3GPP, May 27, 2016, S2-162365, seven pages.
Office Action, Japanese Patent Application No. 2019-019897, dated Dec. 6, 2019, three pages.

\* cited by examiner

NETWORK SLICE SELECTION

PRIORITY CLAIM

This application is a continuation of and claims priority to U.S. patent application Ser. No. 15/128,622, entitled "Network Slice Selection," filed Sep. 23, 2016, which is the U.S. National Stage Application of International Patent Application No. PCT/CN2016/088320, titled "Network Slice Selection", filed Jul. 4, 2016, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to apparatuses, systems, and methods for network slice selection.

DESCRIPTION OF THE RELATED ART

Wireless communication systems are rapidly growing in usage. Further, wireless communication technology has evolved from voice-only communications to also include the transmission of data, such as Internet and multimedia content. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

As demand for wireless communication systems grows and new use cases for wireless communication arise, there is a seemingly continual need to develop next generation wireless communication techniques and standards. One such developing concept may include network slicing, which may allow a network operator to create different "network slices" configured to address different wireless communication use cases and scenarios in a customized manner.

SUMMARY

Techniques for a cellular network to determine or select which network slice, and which network slice functions within a network slice, are to be used for a given service request by a wireless device attached to the cellular network, may be important in order to effectively support network slicing by network operators. Embodiments are presented herein of apparatuses, systems, and methods for performing network slice selection.

According to the techniques described herein, a network architecture may be proposed in which a network slice selection entity of a cellular network is provided with an interface to a radio access network node of the cellular network and an interface to a user data repository of the cellular network. The network slice selection entity may be responsible for selecting a network slice (potentially including a core network slice and/or a radio access network slice) for a particular wireless device connection, e.g., upon request by the serving radio access network node for the wireless device. The network slice selection may be based on a service type and/or application associated with the service request for which network slice selection is being performed, user subscription information, network operator policy, and/or any of various other considerations. In some instances, the wireless device may provide an indication of a preferred network slice for its service request, which may be considered by the network slice selection entity when selecting the network slice.

The network slice selection entity may not itself perform control signal or user data routing, but may store address information for the control plane entry point for each core network slice, and may provide that information to a radio access network node that requests network slice selection in response to the request.

Further according to the techniques described herein, it may be possible for a wireless device to connect to multiple network slices at the same time. For example, each service or connection request may trigger a new query to the network slice selection entity, which may result in some or all of those service or connection request being associated with different network slices.

The techniques described herein may be implemented in and/or used with a number of different types of devices, including but not limited to cellular phones, tablet computers, wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
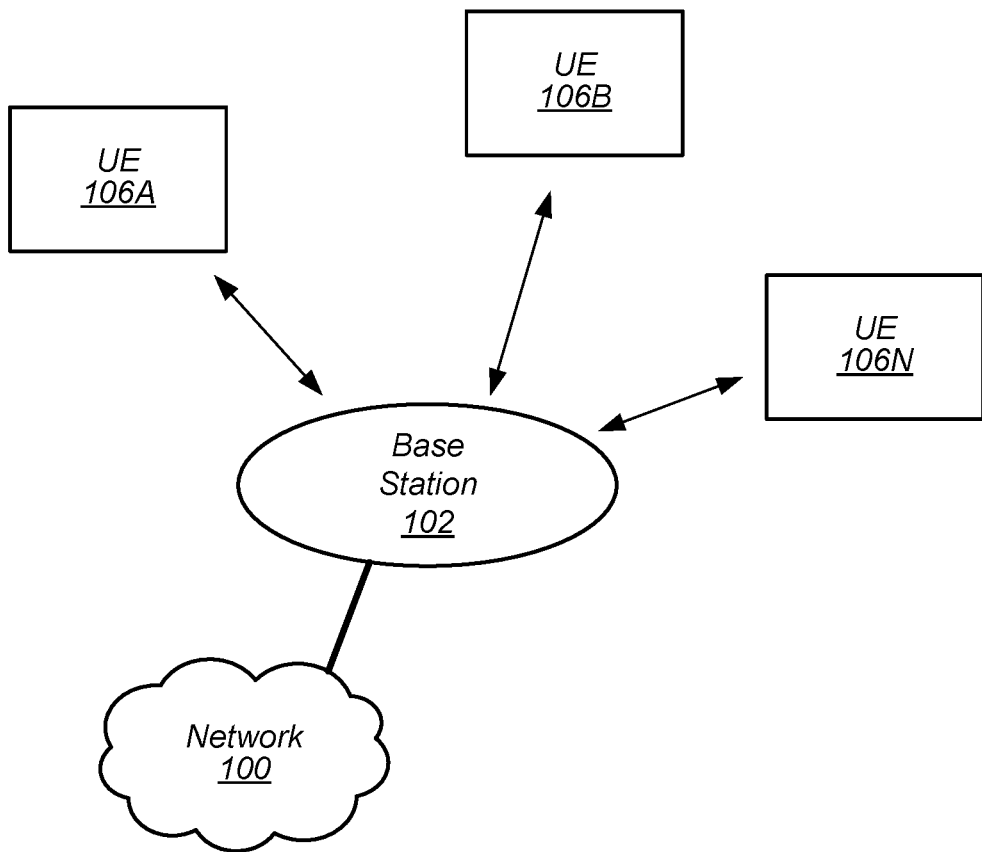
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
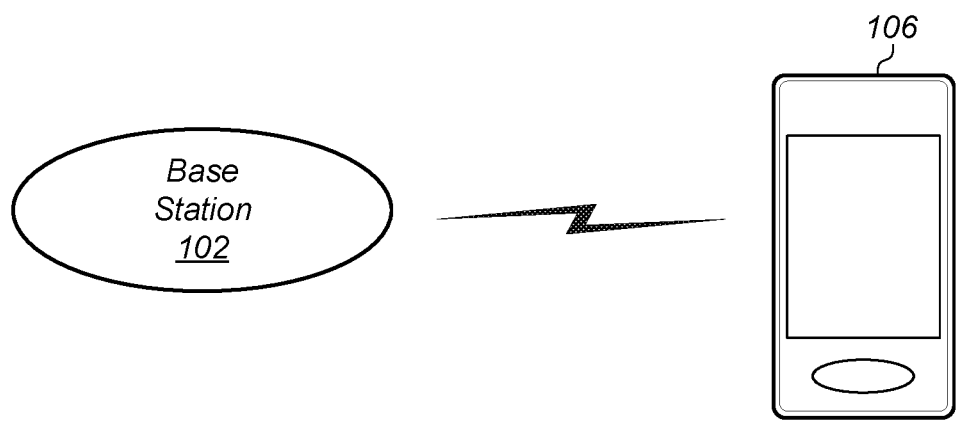
FIG. 2 illustrates an exemplary base station (BS) in communication with an exemplary wireless user equipment (UE) device, according to some embodiments.

FIGS. 1 and 2—Communication System

FIG. 1 illustrates an exemplary (and simplified) wireless communication system in which aspects of this disclosure may be implemented, according to some embodiments. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more (e.g., an arbitrary number of) user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. The base station 102 may also be equipped to communicate with a network 100. For example, the network 100 may include a core network (potentially including any number of core network slices) of a cellular service provider (e.g., a public land mobile network (PLMN)). Alternatively or in addition, the network 100 may include (or be coupled to) a telecommunication network such as a public switched telephone network (PSTN), the Internet, and/or various possibilities). Thus, the base station 102 may facilitate communication among the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards. In other words, at least according to some embodiments, the base station 102 may function as a node in the radio access network (RAN) of a cellular network operator.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
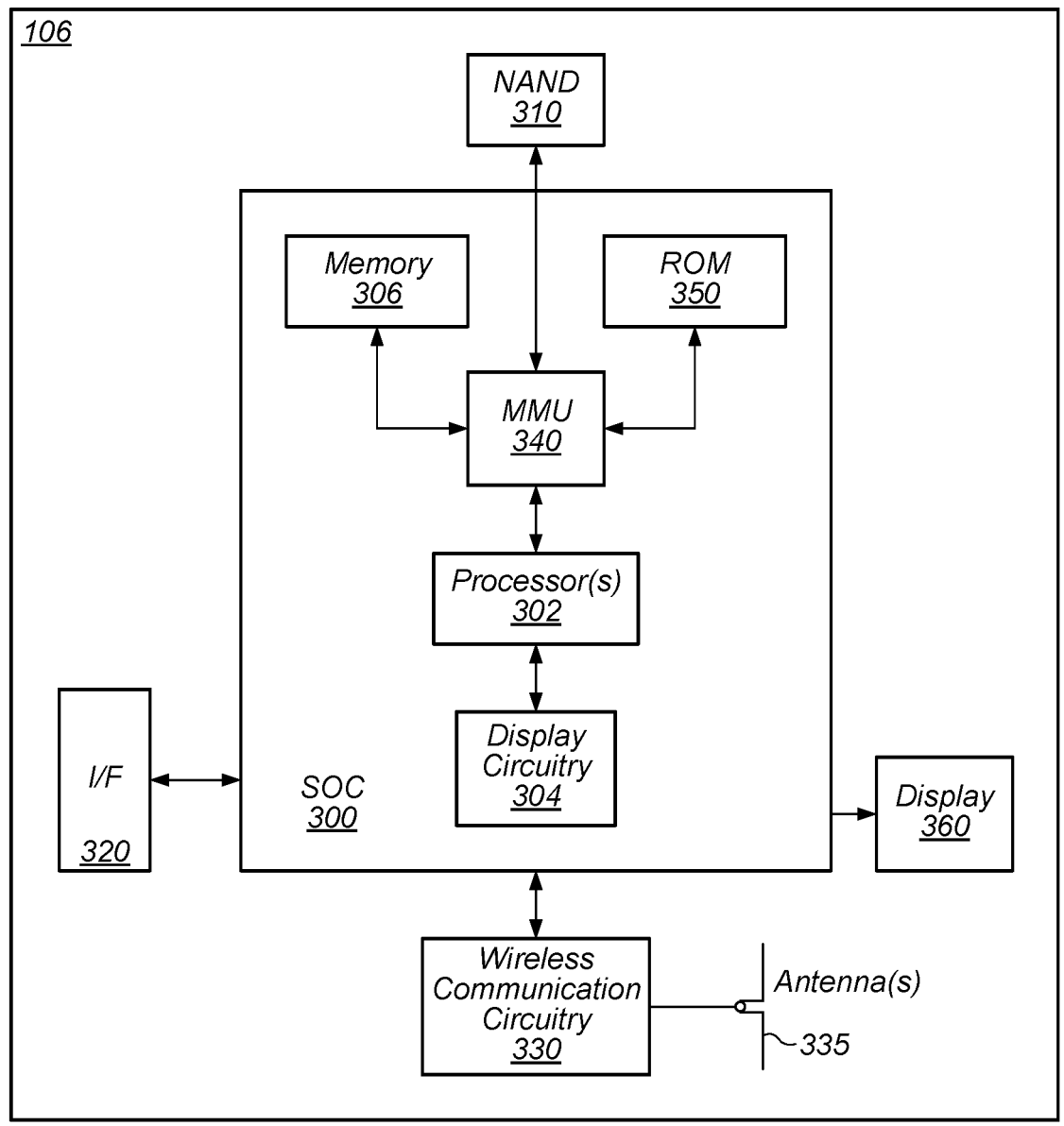
FIG. 3 illustrates an exemplary block diagram of a UE device, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

As described further subsequently herein, the UE 106 may include hardware and/or software components for implementing and/or supporting implementation of features described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
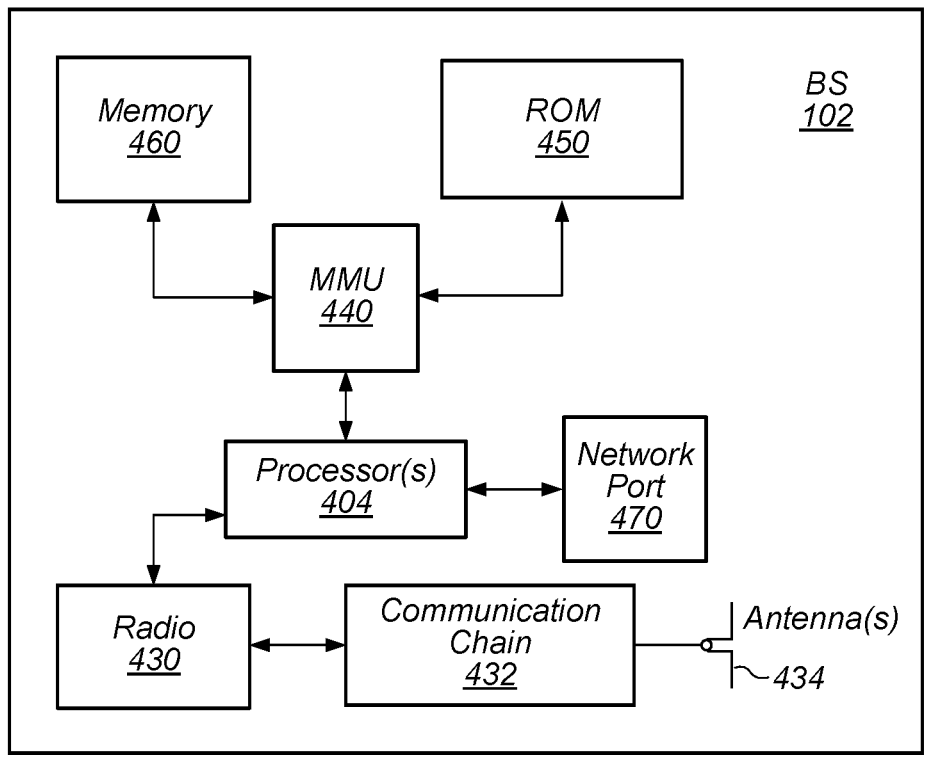
FIG. 4 illustrates an exemplary block diagram of a BS, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to any of various possible cellular network entities, e.g., including one or more core network instances or core network slices of a cellular service provider, a network slice selection function, and/or various other possible cellular network entities. The core network(s) may provide mobility related services and/or other services to a plurality of devices, such as UE devices 106. In some cases, the network port 470 may couple to a telephone network via the core network(s), and/or the core network(s) may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

The BS 102 may be configured to act as a node of a radio access network (RAN) of a cellular network. Thus, the BS 102 may provide radio access to the cellular network (e.g., including one or more core network instances, as previously noted) to wireless devices. According to some embodiments, the BS 102 may be configured to implement multiple possible RAN slices, e.g., to accomodate different scenarios with respect to RAN functionality, performance, isolation, etc. The different RAN slices may include different sets of RAN functions, and/or differently configured RAN functions (e.g., having different resource pools, etc.).

As described further subsequently herein, the BS 102 may include hardware and software components for implementing and/or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
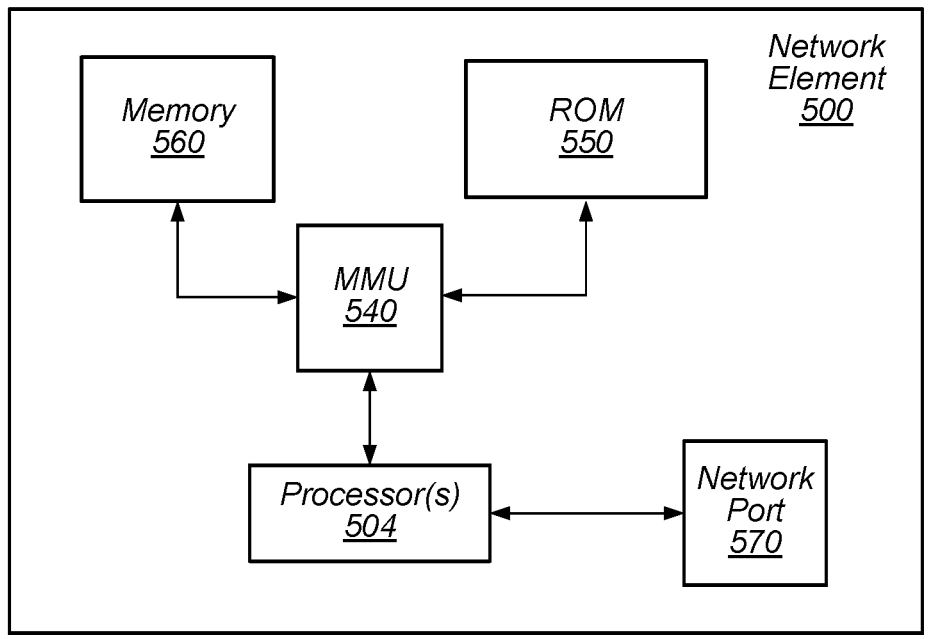
FIG. 5 illustrates an exemplary block diagram of a core network element, according to some embodiments.

FIG. 5—Exemplary Block Diagram of a Network Element

FIG. 5 illustrates an exemplary block diagram of a network element 500, according to some embodiments. According to some embodiments, the network element 500 may implement one or more logical functions/entities of a cellular core network, such as a mobility management entity (MME), serving gateway (S-GW), etc. As another possibility, the network element 500 may implement a network slice selection function (NSSF) entity. It is noted that the network element 500 of FIG. 5 is merely one example of a possible network element 500. As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The network element 500 may include at least one network port 570. The network port 570 may be configured to couple to one or more base stations and/or other cellular network entities and/or devices. The network element 500 may communicate with base stations (e.g., eNBs) and/or other network entities/devices by means of any of various communication protocols and/or interfaces.

As described further subsequently herein, the network element 500 may include hardware and software components for implementing and/or supporting implementation of features described herein. The processor(s) 504 of the core network element 500 may be configured to implement or support implementaiton of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Network Slicing

Network slicing is a concept that may enable a cellular network operator to create customized networks to provide solutions for different market scenarios that have diverse requirements, e.g., in the areas of functionality, performance and isolation. For example, a cellular network may provide multiple network slices, of which each network slice may include a set of network functions (NFs) selected to provide some specific telecommunication service(s) and network capabilities, and the resources to run these NFs.

Network slicing techniques are currently actively under development and may figure prominently in fifth generation ("5G") cellular communication technologies. For example, global and regional organizations such as next generation mobile networks (NGMN), third generation partnership project (3GPP), 5G public private partnership (5GPPP), 4G Americas, 5G Forum, International Mobile Telecommunications 2020 (IMT-2020), etc., have documented possible use cases and requirements regarding network slicing.

Among the possible network slicing solutions, Radio Access Network (RAN) slicing and Core Network (CN) slicing are both possible and are currently under study by 3GPP RAN working groups (WGs) and 3GPP service and system aspects (SA) WGs separately. For example, 3GPP TR 23.799 is maintained by 3GPP SA2, and describes several candidate solutions for 5G network architecture and related key issues, including network slicing.

According to some embodiments, a number of key principles may be followed to support network slicing in a RAN. For example, at least in some instances, some or all of the following principles may be followed.

As one possible principle, the RAN may be aware of the possibility of network slices. For example, a RAN may be expected to support differentiated handling of different network slices that have been pre-configured by the operator.

As another possible principle, the RAN may be expected to support the selection of the RAN part of the network slice by an index or ID provided by the UE. The index or ID may unambiguously identify one of the pre-configured network slices in the PLMN.

A further principle may relate to resource management between slices. For example, the RAN may be expected to support policy enforcement between slices as per service level agreements.

Yet another principle may relate to support of Quality of Service (QoS). For example, the RAN may be expected to support QoS differentiation within a slice.

A still further principle may relate to RAN selection of a CN entity. For example, the RAN may be expected to support initial selection of the CN entity for initial routing of uplink messages based on received slice index and a mapping in the RAN node (CN entity, slices supported).

Another possible principle may relate to resource isolation between slices. For example, the RAN may be expected to support resource isolation between slices.

Variations on the above principles and/or alternative principles are also possible. Furthermore, note that, at least according to some embodiments, the manner in which a RAN supports the slice enabling in terms of RAN functions (i.e., the set of network functions that form each slice) may be implementation dependent, e.g., provided the generally agreed upon principles for supporting network slicing are upheld.

FIGS. 6-13 illustrate various possible network slice selection logical architectures and associated procedures. Note that FIGS. 6-13 and the information provided herein below in conjunction therewith are provided by way of example, and are not intended to be limiting to the disclosure as a whole. Numerous variations and alternatives to the details provided herein below are possible and should be considered within the scope of the disclosure.

Figure 6:
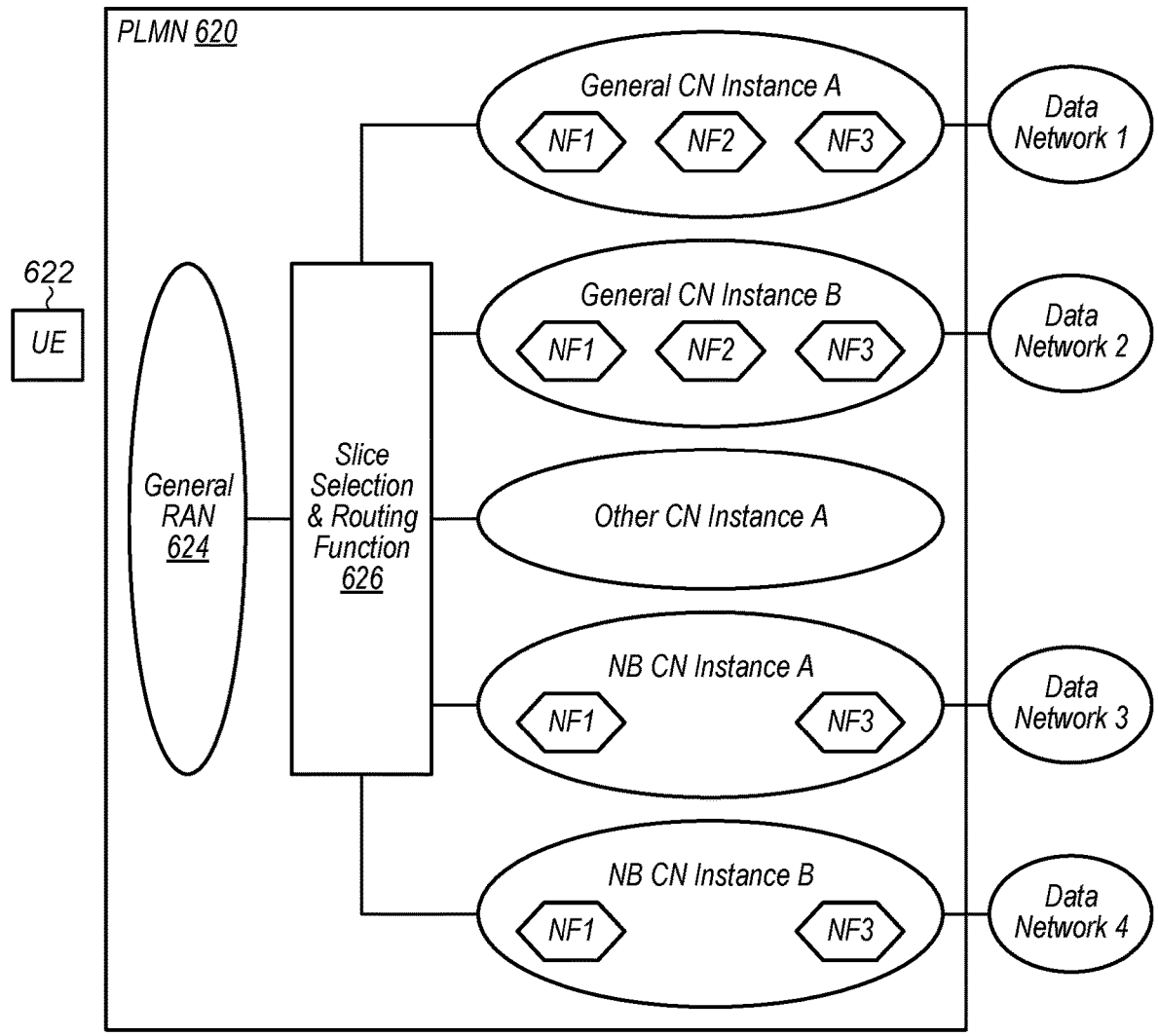
FIG. 6 illustrates a first exemplary possible network slice selection logical architecture, according to some embodiments.

FIG. 6—First Network Slice Selection Solution

FIG. 6 illustrates one possible cellular network logical architecture that may support network slice selection. The illustrated architecture and associated procedures and details of FIG. 6 may be referred to herein as a "first solution". According to this architecture and function, it is assumed that any slicing of a PLMN 620 is not visible to the UEs (e.g., UE 622) at the radio interface. Additionally, it is assumed according to this architecture and function that the RAN (e.g., general RAN 624) is not sliced.

As shown, according to the architecture of FIG. 6, a slice selection and routing function 626 is defined to link the radio access bearer(s) of a UE 622 with the appropriate core network instance. Notable characteristics of the architecture of FIG. 6 may include that the RAN 624 appears as one RAT+PLMN to the UE 622, and that any association with a particular network instance is performed by network 620 internally.

According to the architecture of FIG. 6, the illustrated slice selection and routing function 626 may be provided by the RAN 624 or by the CN. The slice selection and routing function 626 may route signaling between the RAN 624 and the selected CN instance based on information provided by the UE 622 and possibly based on CN provided information.

Figure 7:
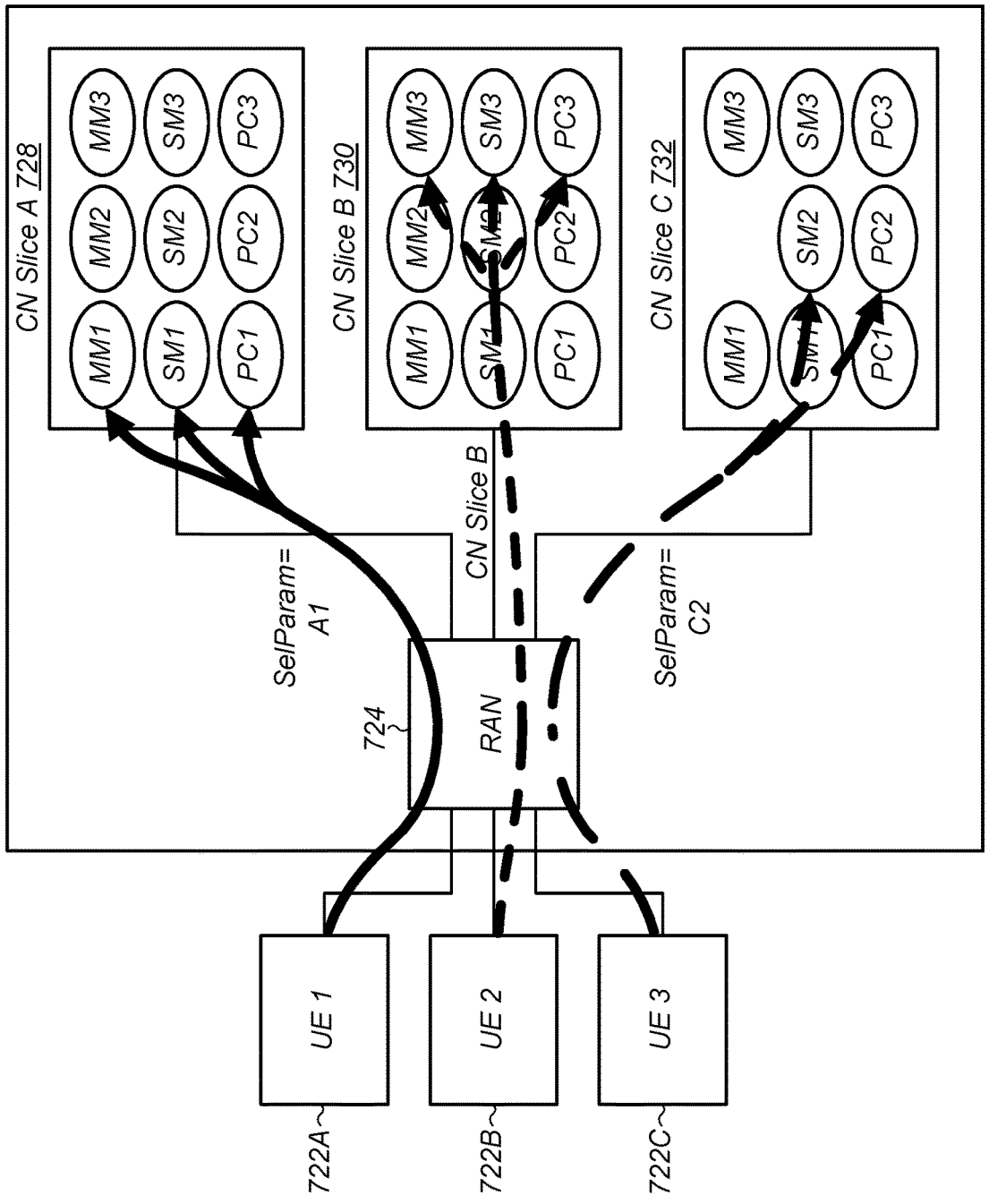
FIG. 7 illustrates a second exemplary possible network slice selection logical architecture, according to some embodiments.

FIG. 7—Second Network Slice Selection Solution

FIG. 7 illustrates another possible cellular network logical architecture that may support network slice selection. The illustrated architecture and associated procedures and details of FIG. 7 may be referred to herein as a "second solution".

This second solution proposes that a multi-dimensional descriptor (e.g. application, service descriptor) is configured in a UE (e.g., one of the illustrated UEs 722A-C). The UE 722 may report the multi-dimensional descriptor to the network. Based on this multidimensional descriptor provided by the UE 722, and on other information (e.g. subscription information) available in the network, the relevant functions within a certain network slice can be selected.

Multiple network slice and function selection options may be possible according to the architecture of FIG. 7. For example, a two step selection mechanism or a one step selection mechanism may be used for selecting a core network slice and for selecting network functions within the selected network slice.

According to the two-step selection mechanism, a selection function in the RAN 724 may use the application ID (e.g., part of the multidimensional descriptor), along with information (e.g. subscription information) available in the network, to select the appropriate core network slice (e.g., one of the core network slices 728, 730, 732). A selection function within the core network may use the service descriptor (e.g., part of the multidimensional descriptor) to select the appropriate network functions within the network slice.

According to the one-step selection mechanism, a selection function within the RAN 724 or within the core network may use the application ID and the service descriptor (e.g., parts of the multi-dimensional descriptor), along with information (e.g. subscription information) available in the network, to select the appropriate network slice (e.g., one of the core network slices 728, 730, 732) and network functions. The selection function may then (re-)direct the UE 722 accordingly.

Figure 8:
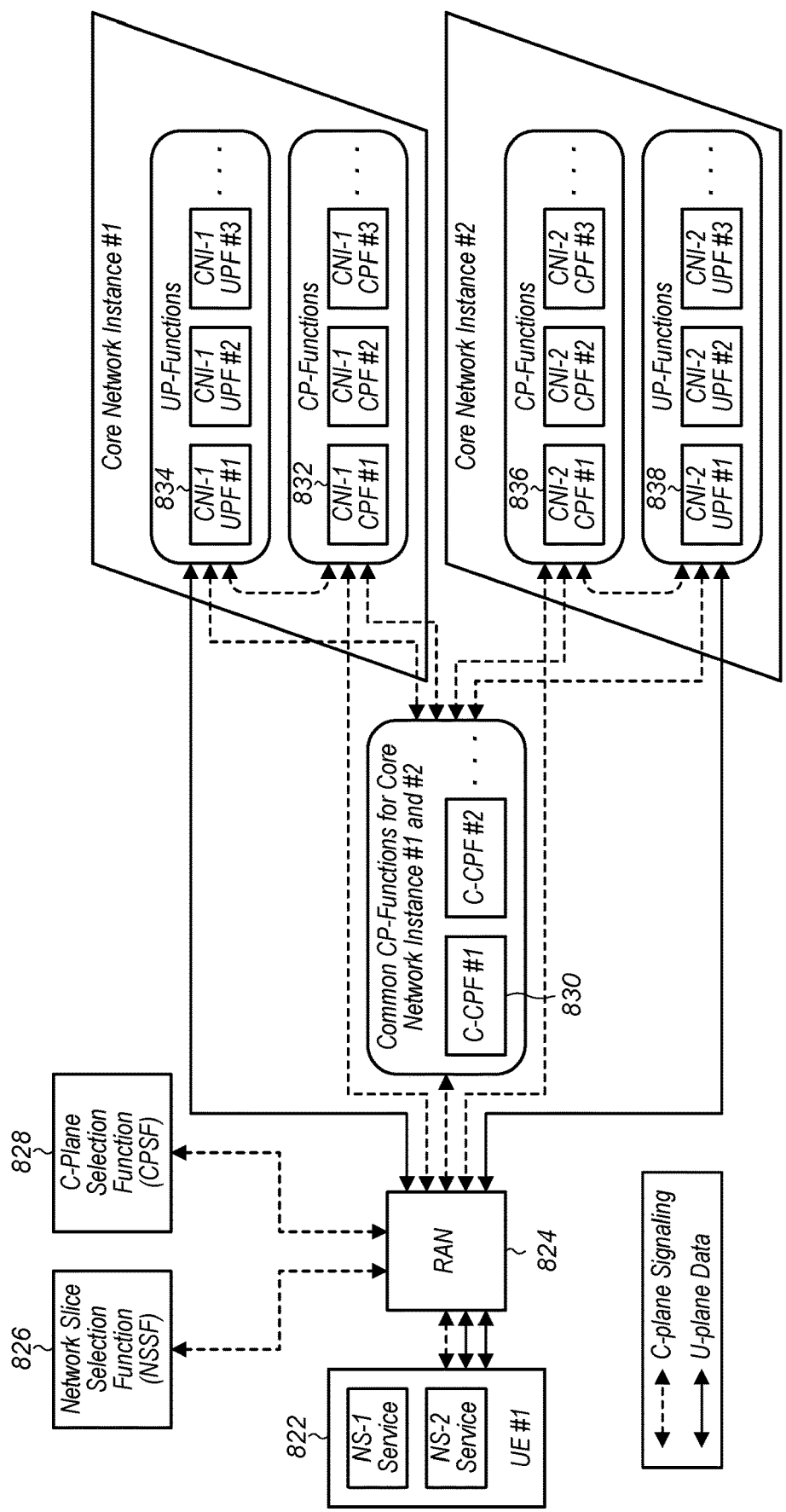
FIGS. 8-9 illustrate a third exemplary possible network slice selection logical architecture and associated procedures signal flow, according to some embodiments.
Figure 9:
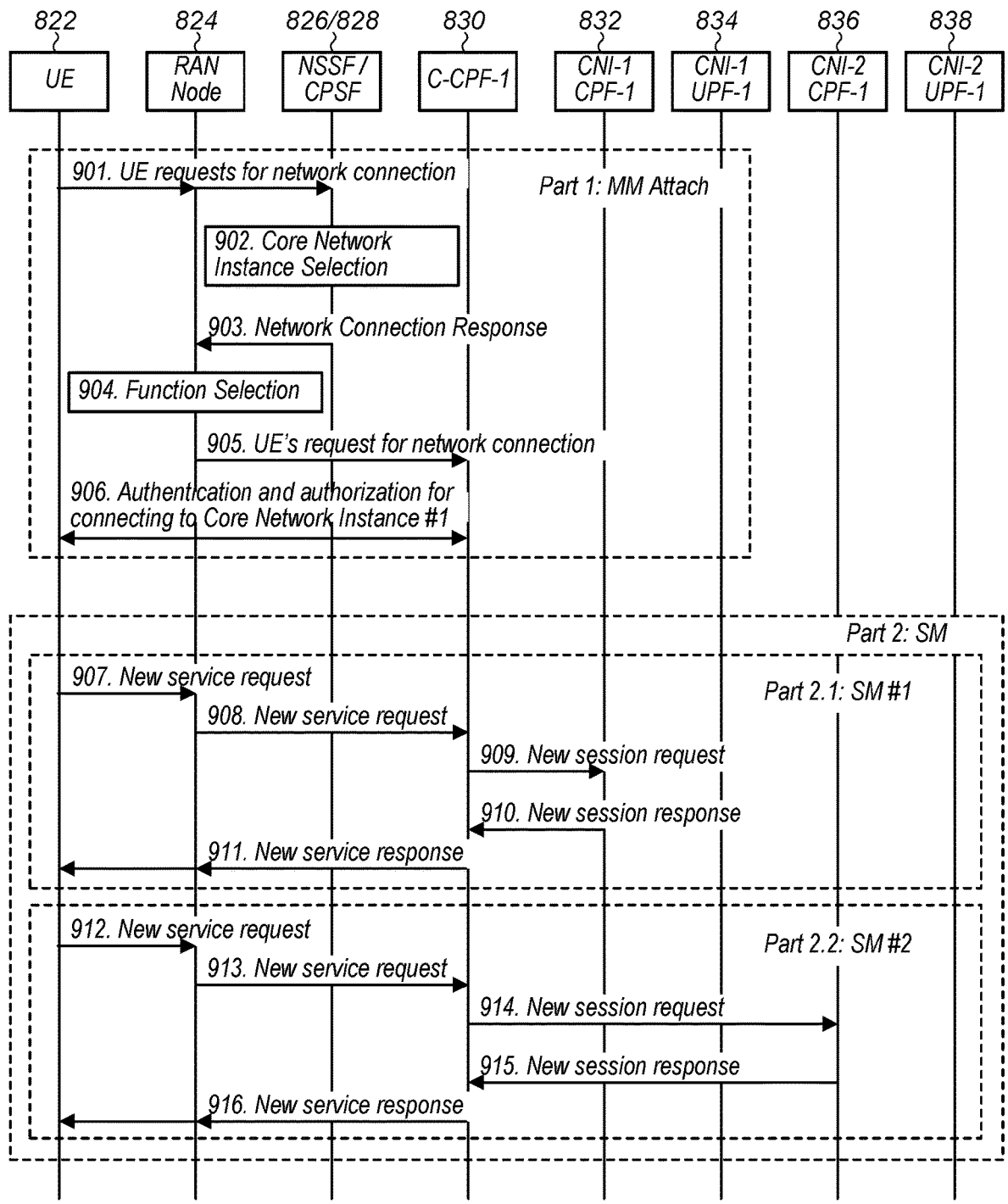

FIGS. 8-9—Third Network Slice Selection Solution

FIG. 8 illustrates a further possible cellular network logical architecture that may support network slice selection, while FIG. 9 illustrates possible signal flow procedure details associated with the architecture of FIG. 8. The illustrated architecture of FIG. 8 and associated procedures and details of FIG. 9 may be referred to herein as a "third solution". According to this architecture and function, as shown, a single set of control plane (or "c-plane" or "CP") functions (e.g., including C-CPF-1 830, etc.) that are in common among multiple core network instances (e.g., core network instance 1 (CNI-1), core network instance 2 (CNI-2)) is shared across the core network instances. Other c-plane functions that are not in common among the core network instances reside in their respective core network instances (e.g., CPF-1 832 within CNI-1, CPF-1 836 within CNI-2, etc.), and are not shared with other core network instances. Similarly, different core network instances may include different user plane (or "u-plane" or "UP") functions (e.g., UPF-1 834 within CNI-1, UPF-1 838 within CNI-2), etc.).

According to the architecture of FIG. 8, a set of c-plane functions may be responsible, for example, for supporting UE mobility if demanded or for admitting the UE 822 into the network by performing authentication and subscription verification.

The network slice selection function (NSSF) 826 illustrated in FIG. 8 may be responsible for selecting a core network instance to accommodate the UE 822, e.g., by taking into account the UE's subscription characteristics and any session specific parameters, e.g., the UE Usage Type.

The c-plane selection function (CPSF) 828 illustrated in FIG. 8 may be responsible for selecting with which c-plane functions within the selected core network instance the RAN node (e.g., base station) 824 serving the UE 822 should communicate. This selection of c-plane functions may depend on session specific parameter(s), e.g., UE Usage Type.

FIG. 9 illustrates possible signal flow procedures associated with the network slice selection logical architecture of FIG. 8 (e.g., associated with the third solution). The illustrated signal flow procedures include a possible signal flow for a mobility management attach procedure (part 1: steps 901-906) and possible signal flows for session management (part 2: steps 907-916, including part 2.1: steps 907-911, and part 2.2: steps 912-916).

As shown, in step 901, when a UE 822 first connects to the operator's network, it sends a network connection request to the RAN node 824. If the UE 822 provides enough information to the RAN node 824 to route the message to the appropriate core network instance and its corresponding c-plane function, the RAN node 824 routes this request to this c-plane function. Hence, the flow continues in step 904. Otherwise, the RAN node 824 forwards it to the NSSF/CPSF 826/828, and the flow continues in step 902.

In step 902, the NSSF/CPSF 826/828 determines which core network instance and its corresponding c-plane function(s) are to be connected to by taking into account information in the request from a UE 822 in step 901. In addition, other information from the subscription database may be also considered. In this signal flow example depicted in FIG. 9, this is the core network instance #1 (CNI-1), which may include common c-plane functions (C-CPF-1) 830 and CNI-1 specific c-plane functions (CPF-1) 832. Note that CNI-1 may also include certain user plane (u-plane or UP) functions (UPF-1) 834.

In step 903, the NSSF/CPSF 826/828 sends a response to the RAN node 824 with the selected C-CPF-1 830/CPF-1 832 of the selected CNI-1.

In step 904, based on the response sent in step 903, the RAN node 824 selects c-plane functions (e.g., C-CPF-1 830, CPF-1 832) of the selected CNI-1.

In step 905, the RAN node 824 forwards the network connection request from the UE 822 to this C-CPF-1 830, (e.g., which was included among the selected c-plane functions from steps 903 and step 904).

In step 906, authentication and admitting the UE 822 into the selected CNI-1 is performed.

In step 907, the UE 822 provides a request to RAN node 824 for a communication service (e.g., "service #1" that is provided by the CNI-1).

In step 908, the RAN node 824 forwards the request for service to the C-CPF-1 830.

In step 909, the C-CPF-1 830 selects CPF-1 832 of the CNI-1 and forwards the request for the service #1 to this CPF-1 832

In step 910, after a successful session establishment, the CPF-1 832 in CNI-1 sends the session response back to C-CPF-1 830.

In step 911, the C-CPF-1 830 sends a new service response back to the UE 822 via the RAN node 824.

In step 912, the UE 822 provides a request to RAN node 824 for a new communication service that is of a different service type (e.g., "service #2" than the previous service. A different core network instances (core network instance #2 (CNI-2)) may be selected for this new communication service. Note that CNI-2 may include common c-plane functions 830 (e.g., in common with CNI-1) and CNI-2 specific c-plane functions (CPF-1) 836. Note that CNI-2 may also include certain u-plane functions (UPF-1) 838.

In step 913, the RAN node 824 forwards the request for new communication service to the C-CPF-1 830.

In step 914, the C-CPF-1 830 selects CPF-1 836 of the CNI-2 and forwards the request for the service #2 to this CPF-1 836 in CNI-2.

In step 915, after a successful session establishment, the CPF-1 836 in CNI-2 sends the session response back to C-CPF-1 830.

In step 916, the C-CPF-1 830 sends a new service response back to the UE 822 via the RAN node 824.

Figure 10:
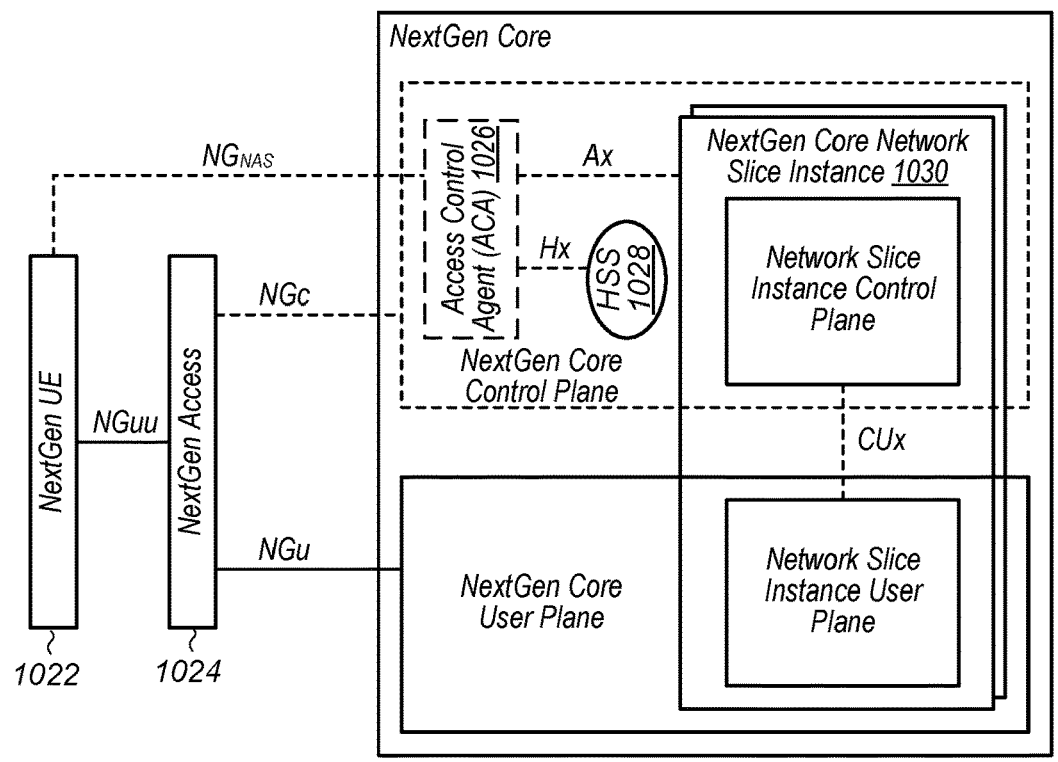
FIGS. 10-11 illustrate a fourth exemplary possible network slice selection logical architecture and associated procedures signal flow, according to some embodiments.
Figure 11:
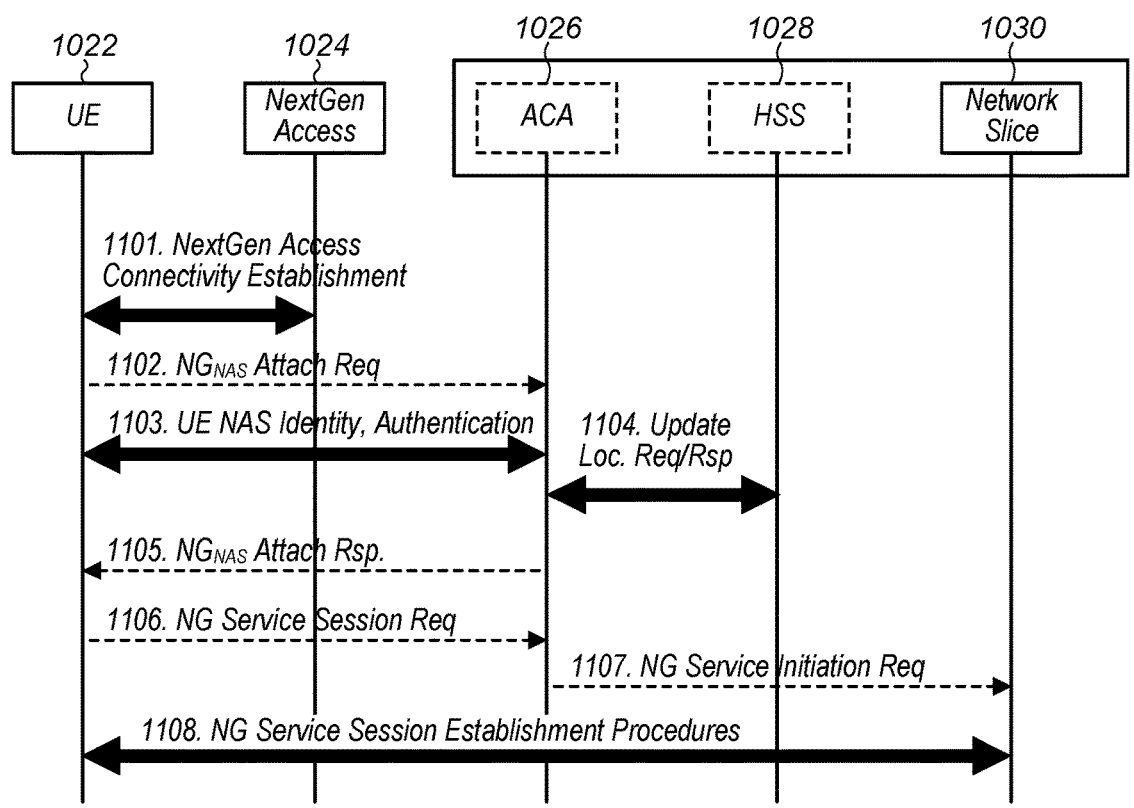

FIGS. 10-11—Fourth Network Slice Selection Solution

FIG. 10 illustrates a still further possible cellular network logical architecture that may support network slice selection, while FIG. 11 illustrates possible signal flow procedure details associated with the architecture of FIG. 10. The illustrated architecture of FIG. 10 and associated procedures and details of FIG. 11 may be referred to herein as a "fourth solution".

According to this architecture and function, an Access Control Agent (ACA) 1026 is a common control plane network function which has the following key functions. The ACA 1026 may operate as authenticator to support the mobile network operator (MNO) authentication and authorization of the UE 1022 to access the NextGen core. The ACA 1026 may select the NextGen Core network slice instance 1030 to serve the UE's service request. The ACA 1026 may forward the NGNAS signaling to the UE's serving network slice's control plane network functions once the network slice session is setup. The ACA 1026 may support the NextGen Core's network slice instance 1030 binding with the NextGen Access 1024. The ACA 1026 may support roaming (e.g., coordinated with the network slice instance 1030 selected from the visiting or home NextGen Core).

During the UE initial attach, the ACA 1026 may initiate procedures that are used to identify, authenticate, and authorize the UE. Once the UE 1022 has been successfully authenticated via the support of ACA 1026, the ACA 1026 may update the home subscriber server (HSS) 1028 with the information of the UE 1022 and may also request the subscriber profile of the UE 1022, e.g., to be stored in its cache. A unique short temporary identity (e.g., referred as A-TMSI) may be assigned to the UE 1022 to identify the UE's context in ACA's cache corresponding to the UE's subscriber profile.

The UE subscription information fetched from the HSS may include the pre-provisioned UE's eligible NG Service Type(s) (e.g., vehicle-to-X (V2X), embedded mobile broadband (eMBB), etc.) that indicate the type of network services that have been subscribed by the UE 1022, terminal capabilities, etc.

Once the UE 1022 is successfully authenticated and the NAS security association is established with the NextGen Core, the UE 1022 may initiate a NG Service Session Request, which may include NG Service Type information and Request Resource Allocation information. The ACA 1026 may refer to certain required UE's network slice instance selection information (e.g., UE's capability, UE's location, the policy of UE's home PLMN and the NG Service Type information, etc.) to select the appropriate Network Slice instance 1030 and to trigger the NG Service Initiation Request, which will then initiate the NG Service Session Establishment for the UE 1022 for the target network service. The ACA 1026 may need to consult with HSS 1028 to verify the eligibility of the NG Service Type that is provided by the UE 1022.

Note that the NG Service Session Establishment procedures may include network slice instance access authentication, session and mobility anchor establishment, QoS management and NG Service Session Binding with the NextGen access 1024, etc.

FIG. 11 illustrates signal flow procedures associated with the network slice selection logical architecture of FIG. 10 (e.g., associated with the fourth solution).

As shown, in step 1101, a UE 1022 may establish connectivity to the NextGen Access 1024 at the RRC layer.

In step 1102, the UE 1122 may initiate a NGNAS Attach Request to establish connectivity with the NextGen Core over the RRC connectivity. As part of this, the NextGen Access node 1024 may select the appropriate ACA 1026 for the NGNAS Attach Request. In other words, the NextGen Access node 1024 may select the target ACA 1026 to serve the UE 1022.

In step 1103, if the ACA 1026 is not able to identify the UE 1022 with the identity given in the NGNAS Attach Request message, the ACA 1026 may initiate an Identity Request to the UE 1022. The UE 1022 may respond back with its identity in an Identity Response message to the ACA 1026. After successful authentication, the network may initiate a Security mode command to encrypt the NGNAS message between the UE 1022 and the ACA 1026, e.g., to protect the privacy of the subscriber. Subsequent NGNAS messages may thus be integrity protected.

In step 1104, after the successful authentication, the ACA 1026 may update the HSS 1028 with the context of the UE 1022, e.g., using an Update Location Request message, and may also include a request for the subscriber profile for this UE 1022 from the HSS 1028. The HSS 1028 may update its database with the current context of the UE 1022 and respond to ACA 1026 with the subscriber profile of the UE 1022, if requested, in the Update Location Acknowledge message.

In step 1105, the ACA 1026 may respond to the UE 1022 with a successful NGNAS Attach Response.

In step 1106, the UE 1022 may initiate a NG Service Session Request to its serving ACA 1026, which may include its target NG Service type and Resource Allocation request information.

In step 1107, the ACA 1026 may refer to the required network slice instance selection information (e.g., UE's capability, UE's location, UE's HPLMN policy and the NG Service Type information etc.) to select the appropriate network slice instance 1030 to trigger the NS Service Initiation Request for the UE 1022.

In step 1108, the UE 1022 may perform the NG Service Session Establishment procedures with the network functions within the network slice instance 1030, the NextGen Access 1024 and the UE 1022.

Figure 12:
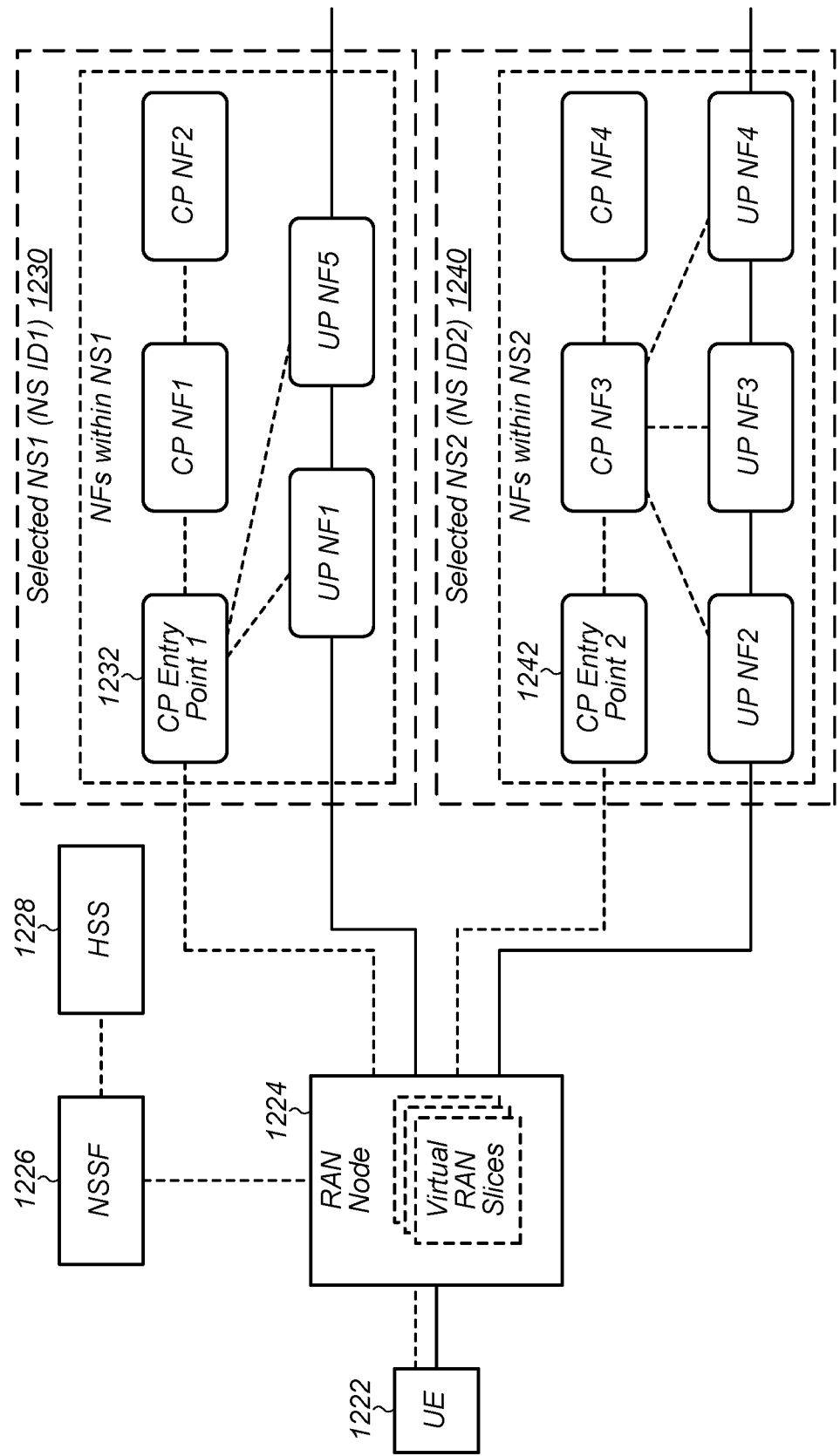
FIGS. 12-13 illustrate a proposed exemplary possible network slice selection logical architecture and associated procedures signal flow, according to some embodiments.
Figure 13:
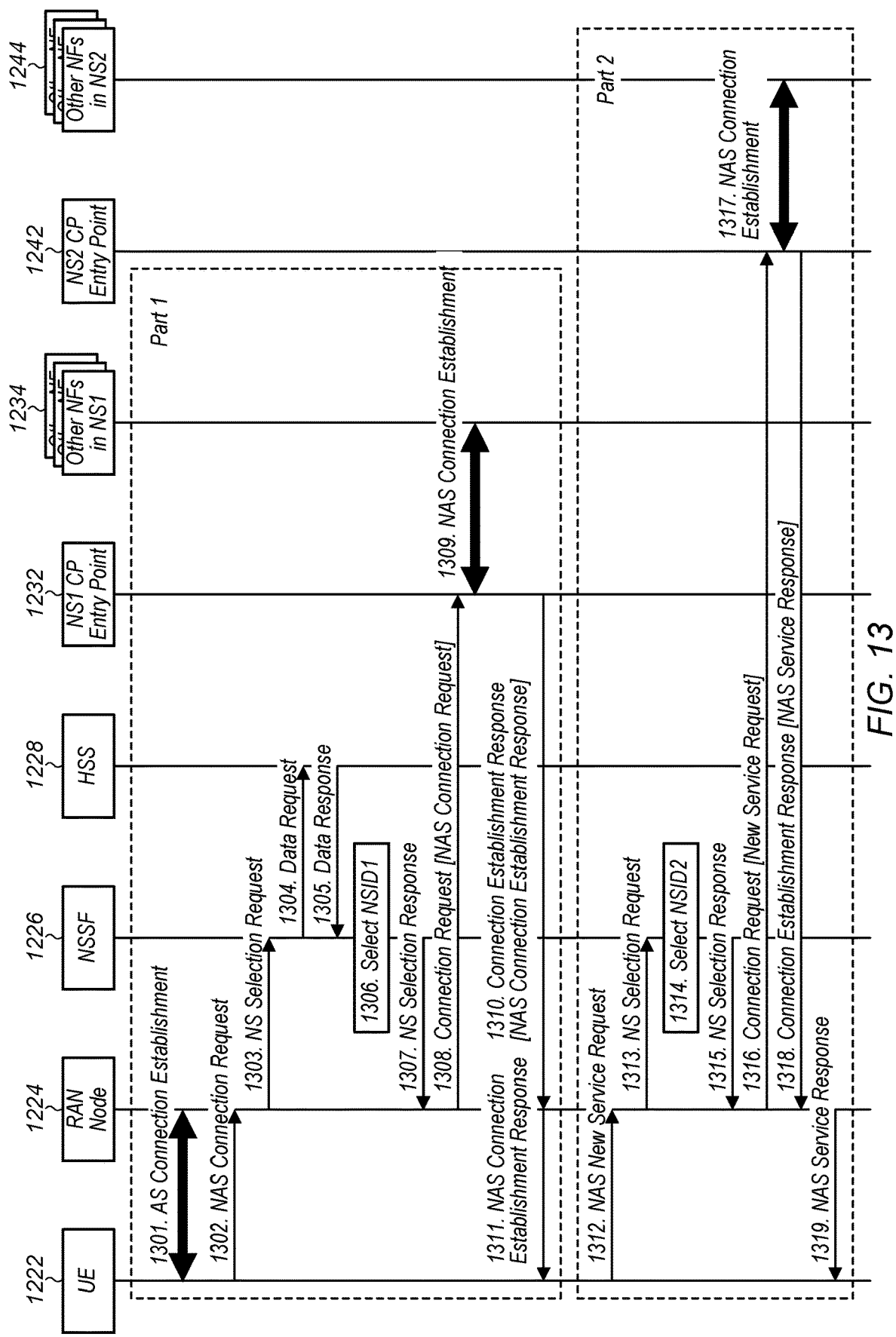

FIGS. 12-13—Proposed Network Slice Selection Solution

The previously described logical architectures supporting network slicing (i.e., encompassing the first, second, third, and fourth solutions) may suffer from a variety of limitations. For example, in the first and fourth solutions, all signaling is routed through the slice selection and routing function or the access control agent respectively. In addition, in the first solution, user data is also routed through the slice selection and routing function. Such architectures may be relatively inflexible and may be forced to provide particularly robust and powerful network slice selection entities and/or may potentially suffer from a data and/or signaling bottleneck or even breakdown. The second solution provides network slice selection techniques only in a general manner, does not include any specific procedure details for network slice selection, and does not clearly provide means for a communication device to connect to multiple (e.g., different) network slices. The third solution assumes that common control plane functions exist for different network slices, which may impose a potentially undesirable rigidity to the architecture.

Accordingly, FIG. 12 illustrates a possible cellular network logical architecture that may support network slice selection in a manner that addresses such limitations, while FIG. 13 illustrates possible signal flow procedure details associated with the architecture of FIG. 12. Thus, the illustrated architecture of FIG. 12 and associated procedures and details of FIG. 13 may be referred to herein as a "proposed architecture" and/or "proposed solution".

As shown, the network slice selection logical architecture of FIG. 12 includes a UE 1222, a radio access network (RAN) node 1224, a Network Slice Selection Function (NSSF) 1226, and a user subscription information repository (e.g., HSS) 1228. The NSSF 1226 may include an interface to the RAN node 1224 and an interface to the HSS 1228. The NSSF may be responsible for selecting a Network Slice for a particular UE connection upon request by the RAN node 1224, e.g., based on user subscription information from the HSS and the network operator's policies. As further shown, the proposed architecture may include multiple core network slices (e.g., NS1 1230, NS2 1240, etc.). The RAN node 1224 may also implement multiple (e.g., virtual) RAN slices, at least according to some embodiments.

As shown, there may be one Control Plane (CP) entry point (e.g., CP entry points 1232, 1242) for each respective network slice. The NSSF 1226 may store addresses (e.g., IP addresses) for these CP entry points, e.g., in pairs with corresponding Network Slice IDs. The network slice ID and address pair selected by the NSSF 1226 for a given UE connection request, e.g., from UE 1222, may be sent to the RAN node 1224 by the NSSF 1226 in a Network Slice selection response. The RAN node may store this pair in UE context information for the UE 1222 and request connection to the specified CP entry point for the UE 1222.

According to some embodiments, the UE 1222 may optionally indicate a preferred Network Slice ID (NSID) to the network. For example, as one possibility, if a UE preferred NSID is provided and matches the selection policy used by the network, the preferred NSID may be chosen by the NSSF 1226 as having highest priority among all matching NSIDs, while if no UE preferred NSID is provided or if the provided UE preferred NSID does not match the selection policy used by the network, the NSSF 1226 may select a different NSID (e.g., one with a highest priority among all matching NSIDs) for the UE 1222.

According to some embodiments, the UE 1222 may be able to connect to more than one network slice at the same time. For example, each time the UE 1222 requests a new connection or new service, the RAN node 1224 may query the NSSF 1226 for an appropriate Network Slice ID for the new connection/service and may establish a connection with the selected network slice via its CP entry point. Thus, the UE 1222 may be capable of communicating with multiple network slices (e.g., NS1 1230 and NS2 1240) in an at least partially temporally overlapping manner.

FIG. 13 illustrates signal flow procedures associated with the network slice selection logical architecture of FIG. 12 (e.g., associated with the proposed solution). The illustrated signal flow procedures include a possible signal flow for a first service request (part 1: steps 1301-1311) and for a second service request (part 2: steps 1312-1319).

As shown, in step 1301, the UE 1222 and RAN node 1224 may establish an access stratum (AS) connection, e.g., including setting up one or more radio resource control (RRC) bearers. According to some embodiments, the RAN node 1224 may broadcast (e.g., in a master information block (MIB), system information block (SIB), etc.) one or more network slice IDs (NSIDs) core network slice IDs (CNSIDs) and/or radio access network slice IDs (RANSIDs) associated with network slices supported by the RAN node 1224. The UE 1222 may consider this information during cell selection, and at least in some instances, may select a serving cell (e.g., RAN node 1224) based at least in part on the network slices indicated to be available from that serving cell.

In step 1302, the UE 1222 may provide a non-access stratum (NAS) connection request message to the selected RAN node 1224. The NAS connection request may function as a ("first") service request, e.g., for requesting a connection to obtain a particular service from the network. The NAS connection request may include any of various types of information, potentially including but not limited to a UE ID, a Service Type, Application ID, etc. Optionally, the UE 1222 may include an indication of one or more preferred network slices (e.g., a UE preferred NSID) in the message.

In step 1303, the RAN node 1224 may send a network slice selection request message to the NSSF 1226, which may include any or all of the information obtained from the UE 1222 in step 1301, e.g., UE ID, Service Type, Application ID, UE preferred NSID, RAN node ID, etc.

In step 1304, the NSSF 1226 may determine whether it has valid subscription data and/or network slice selection related data for the UE 1222. Note that the NSSF 1226 may determine whether any available data for the UE 1222 is valid in any of various manners, as desired; as one possibility, a timer may be initiated when the data is first obtained, and the data may be considered valid until expiration of the timer, after which the data may no longer be considered valid. If the NSSF 1226 determines that it does not have valid subscription data and/or network slice selection related data for the UE 1222 (or does not have sufficient valid data to make a network slice selection for the UE 1222), the NSSF 1226 may request subscription data and/or network slice selection related data for the UE 1222 from the subscription repository (e.g. HSS) 1228.

In step 1305, the HSS 1228 may provide the requested data to the NSSF 1226. The NSSF 1226 may store the data received from the HSS 1228, and (and least in some instances) may start a timer or otherwise initiate a mechanism for monitoring the validity of the data stored for the UE 1222.

In step 1306, the NSSF 1226 may select a network slice for the UE 1222. The network slice may be selected based on any or all of the network operator's network slice selection policies, information relating to physical and/or subscription characteristics of the UE 1222, and/or information relating to the first service request, among various considerations, and may include information received from the UE 1222 by way of the RAN node 1224 in step 1303, information received from the HSS 1228 in step 1305, and/or information stored by the NSSF 1226.

According to some embodiments, a NSID may include a RANSID and a CNSID. At least in some instances, if a UE preferred NSID is provided and is compatible with the selection policy, the UE preferred NSID may be given the highest priority among all matching NSIDs, and may be selected. If the UE preferred NSID is not compatible with the selection policy, the NSSF 1226 may select a different NSID (e.g., a NSID with highest priority among all matching NSIDs). As previously noted, a Network Slice ID may be associated with a single CP entry point, and may further be associated with a set of CP Network Functions and UP Network Functions.

In step 1307, the NSSF 1226 may provide a network slice selection response (result) message to the RAN node 1224, which may indicate the selected NSID (e.g., NSID1 in the example signal flow of FIG. 13) and associated IP address information for the selected CP entry point (e.g., NS1 CP entry point 1232 in the example signal flow of FIG. 13). Note that since each NSID may include a CNSID and a RANSID, at least according to some embodiments, the network slice selection response may implicitly indicate a specific ("first") core network slice and a specific ("first") radio access network slice. As another possibility, the network slice selection response may explicitly include an indication of a selected "first" core network slice and/or "first" radio access network slice for the first service request.

In step 1308, the RAN node 1224 may provide a connection request message to the NS1 CP entry point 1232. The connection request message may include the NAS connection request message, e.g., with the selected NSID1 and RAN node ID. The RAN node 1224 may establish UE context with its selected NSID1 and the NS1 CP entry point IP address. The RAN node 1224 may also associate the UE 1222 to a NSID1 resource pool, and accordingly provide RAN resources to the UE 1222 from the NSID1 resource pool (e.g., at least in association with the first service request).

In step 1309, the NS1 CP entry point 1232 may execute the connection establishment procedure, e.g., as may be pre-defined for the selected NSID1. The connection establishment procedure may be network slice specific, and may involve different network functions (e.g., other NFs in NS1 1234). According to some embodiments, the connection establishment procedure may include any or all of authentication, temporary ID allocation, IP address allocation, session establishment, and/or any of various other elements.

In step 1310, the NS1 CP entry point 1232 may provide a connection establishment response message to the RAN node 1224, which may carry the NAS connection establishment response and one or more addresses for other NFs in NS1 (e.g., UP NF1 IP address, etc.). The RAN node 1224 may update the UE context to add such routing information (e.g., UP NF1 IP address, corresponding AS connection, etc.).

In step 1311, the RAN node 1224 may send the NAS connection establishment response to the UE 1222, which may include such information as a temporary UE ID, an IP address allocated for the UE 1222, and/or other NAS connection related information for the UE 1222.

In step 1312, the UE 1222 may provide a new service request message to the RAN node 1224. The new service request message may function as a "second" service request, e.g., for requesting a connection to obtain a particular service (e.g., different from the first service) from the network. The new service request may include any of various types of information potentially including but not limited to a UE ID, Service Type, Application ID, etc. Optionally, the UE 1222 may include an indication of one or more preferred network slices (e.g., a UE preferred NSID) in the message.

In step 1313, the RAN node 1224 may send a network slice selection request message to the NSSF 1226, which may include any or all of the information obtained from the UE 1222 in step 1312, e.g., UE ID, Service Type, Application ID, UE preferred NSID, RAN node ID, etc.

In step 1314, the NSSF 1226 may determine whether it has valid subscription data and/or network slice selection related data for the UE 1222. Since such information may have been previously obtained (e.g, in steps 1304 and 1305), in this case the NSSF 1226 may have valid subscription data and network slice selection related data for the UE 1222 stored. Additionally, the NSSF 1226 may select a network slice for the UE 1222 for the second service request. The network slice may be selected based on any or all of the network operator's network slice selection policies, information relating to physical and/or subscription characteristics of the UE 1222, and/or information relating to the first service request, among various considerations, and (in this case) may include information received from the UE 1222 by way of the RAN node 1224 in step 1313 and the subscription data and network slice selection related data stored by the NSSF 1226.

In step 1315, the NSSF 1226 may provide a network slice selection response (result) message to the RAN node 1224, which may indicate the selected NSID (e.g., NSID2 in the example signal flow of FIG. 13) and associated IP address information for the selected CP entry point (e.g., NS2 CP entry point 1242 in the example signal flow of FIG. 13. Since each NSID may include a CNSID and a RANSID, at least according to some embodiments, the network slice selection response may implicitly indicate a specific ("second") core network slice and a specific ("second") radio access network slice. As another possibility, the network slice selection response may explicitly include an indication of a selected "second" core network slice and/or "second" radio access network slice for the second service request.

In step 1316, the RAN node 1224 may provide a connection request message to the NS2 CP entry point 1242. The connection request message may include the new service request message, e.g., with the selected NSID2 and RAN node ID. The RAN node 1224 may update the UE context, e.g., adding NSID2 and the NS2 CP entry point IP address. The RAN node 1224 may also associate the new connection of the UE 1222 to a NSID2 resource pool, and accordingly provide RAN resources to the UE 1222 from the NSID2 resource pool (e.g., at least in association with the second service request).

In step 1317, the NS2 CP entry point 1242 may execute the connection establishment procedure, e.g., as may be pre-defined for the selected NSID2. The connection establishment procedure may be network slice specific, and may involve different network functions (e.g., other NFs in NS2 1244).

In step 1318, the NS2 CP entry point 1242 may send a connection establishment response message to the RAN node 1224, which may carry the NAS Service Response and one or more addresses for other NFs in NS2 (e.g., UP NF2 IP address, etc.). The RAN node 1224 may update the UE context to add such new routing information (e.g., UP NF2 IP address, corresponding AS connection, etc.).

In step 1319, the RAN node 1224 may send the NAS service response to the UE 1222.

As previously noted, the proposed solution may provide a number of benefits relative to the previously described (i.e., first, second, third, and fourth) solutions. For example, the proposed solution may demand relatively little processing capability of the network slice selection function, as no signaling or data routing is asked of the NSSF. Further, the proposed architecture may be inherently relatively robust, as even if the NSSF were to (e.g., temporarily) break down, it may still be possible to establish a connection for a UE, e.g., to a default network slice and/or a network slice with which the UE has an existing connection. Additionally, the network functions and their interfaces/procedures for each network slice are defined within the network slice, e.g., through a management and orchestration system. This may simplify the logic between different network slices, and may allow for more flexibility of network slicing deployment use cases (e.g., as network slices don't have to rely on common CP functions.).

In the following section, certain features of the proposed solution and the first, second, third, and fourth solutions are compared and contrasted for illustrative purposes.

All signaling and data will go through the slice selection and routing function in the first solution. As previously noted, this may require the slice selection and routing function to be very strongly robust and to have substantial processing capabilities. The NSSF in the proposed solution may (at least according to some embodiments) be used only for network slice selection and may not process UE NAS messages or route UP data.

The second solution describes general ways for selecting a network slice for a UE. In comparison, the proposed solution supports UEs connecting to multiple different network slices, and includes a detailed connection establishment procedure.

The third solution is based on assumption that common CP functions exist for different network slices. The proposed solution does not require any such assumption. Additionally, in the third solution, the CP function(s) in a network slice instance to which the RAN node connects are selected by RAN node. In comparison, in the proposed solution, the CP function to which the RAN node connects may be indicated by the NSSF. Further, in the third solution, the service request message is always sent to the common CP function by the RAN node, while in the proposed solution, the service request message may be sent to the CP entry point of the selected network slice.

The ACA in the fourth solution may represent the CP anchor for the UE, such that all NAS CP messages may be routed through this ACA function. In contrast, the NSSF in the proposed solution may (at least according to some embodiments) be used only for network slice selection and may not process UE NAS messages.

In the following further exemplary embodiments are provided.

One set of embodiments may include an apparatus, comprising: a processing element configured to cause a network slice selection function (NSSF) cellular network entity of a cellular network to: receive a network slice selection request associated with a service request by a wireless device; select a network slice of the cellular network in response to the network slice selection request; and provide a network slice selection response, wherein the network slice selection response indicates a control plane entry point address for the selected network slice.

According to some embodiments, selecting the network slice is based at least in part on information received from the wireless device by way of the service request.

According to some embodiments, the information received from the wireless device comprises an indication of a preferred network slice, wherein the indication of the preferred network slice is used when selecting the network slice.

According to some embodiments, the processing element is further configured to cause the NSSF to: request user subscription information for the wireless device from a user subscription information repository of the cellular network; and receive user subscription information for the wireless device from the user subscription information repository, wherein selecting the network slice is based at least in part on the user subscription information received from the user subscription information repository.

According to some embodiments, the processing element is further configured to cause the NSSF to: store the user subscription information for the wireless device for at least a period of time in which the stored user subscription information is considered valid; and perform network slice selections for the wireless device during the period of time in which the stored user subscription information is considered valid based at least in part on the stored user subscription information.

According to some embodiments, the network slice selection request is received from a radio access network (RAN) node of the cellular network, wherein the network slice selection response is provided to the RAN node of the cellular network, wherein the cellular network entity does not process user plane data for the wireless device.

According to some embodiments, the network slice selection response further indicates a selected set of control plane network functions and user plane network functions of the selected network slice.

According to some embodiments, the selected network slice comprises a radio access network (RAN) slice and a core network (CN) slice.

A further set of embodiments may include a non-transitory computer accessible memory medium, comprising program instructions executable by a processing element to cause a network slice selection function (NSSF) of a cellular network to: receive a first network slice selection request from a radio access network (RAN) node of the cellular network, wherein the first network slice selection request is associated with a first service request received by the RAN node from a wireless device; and provide a first network slice selection response, wherein the first network slice selection response indicates a control plane entry point address for a first core network slice.

According to some embodiments, the first network slice selection request comprises, for the first service request, an indication of one or more of: wireless device identification information; service type information; application identification information; or a preferred network slice.

According to some embodiments, the program instructions are further executable to cause the NSSF to: determine whether valid subscription information for the wireless device is stored by the NSSF; and obtain subscription information for the wireless device from a home subscriber server (HSS) of the cellular network if valid subscription information for the wireless device is not stored by the NSSF, wherein the first network slice selection response indicates the control plane entry point address for the first core network slice based at least in part on the subscription information for the wireless device.

According to some embodiments, the program instructions are further executable to cause the NSSF to: receive a second network slice selection request from the RAN node of the cellular network, wherein the second network slice selection request is associated with a second service request received by the RAN node from the wireless device; and provide a second network slice selection response, wherein the second network slice selection response indicates a control plane entry point address for a second core network slice.

According to some embodiments, the program instructions are further executable to cause the NSSF to: select the first core network slice of the cellular network for the first service request in response to the first network slice selection request; and select a first RAN slice of the cellular network for the first service request in response to the first network slice selection request, wherein the first network slice selection response further indicates that the first core network slice and the first RAN slice are selected for the first service request.

A still further set of embodiments may include a cellular network entity of a cellular network, comprising: a network interface; and a processing element communicatively coupled to the network interface; wherein the network interface and the processing element are configured to: receive a first service request from a wireless device; provide a first network slice selection request associated with the first service request to a network slice selection function; receive a first network slice selection response indicating that a first core network slice of the cellular network is selected in response to the first network slice selection request, wherein the first network slice selection response further indicates a control plane entry point address for the first core network slice; and establish a connection with the first core network slice using the indicated control plane entry point address for the first core network slice, wherein the connection with the first core network slice is associated with the first service request.

According to some embodiments, the first service request received from the wireless device comprises an indication of a first preferred network slice, wherein the first network slice selection request comprises an indication of the first preferred network slice.

According to some embodiments, the cellular network entity comprises a radio access network (RAN) entity of the cellular network, wherein the network interface and the processing element are further configured to: broadcast an indication of one or more network slices of the cellular network supported by the RAN entity.

According to some embodiments, the cellular network entity comprises a radio access network (RAN) entity of the cellular network, wherein the first network slice selection response further indicates that a first RAN slice of the cellular network is selected, wherein the network interface and the processing element are further configured to: provide RAN resources to the wireless device from a resource pool associated with the first RAN slice.

According to some embodiments, the network interface and the processing element are further configured to: receive a second service request from the wireless device; provide a second network slice selection request associated with the second service request to the network slice selection function; receive a second network slice selection response indicating that a second core network slice of the cellular network is selected in response to the second network slice selection request, wherein the second network slice selection response further indicates a control plane entry point address for the second core network slice; and establish a connection with the second core network slice using the indicated control plane entry point address for the second core network slice, wherein the connection with the second core network slice is associated with the second service request.

According to some embodiments, the connection with the first core network slice and the connection with the second core network slice are established in an at least partially temporally overlapping manner.

According to some embodiments, the first core network slice is a different core network slice than the second core network slice.

Another exemplary set of embodiments may include a method comprising performing any or all parts of any of the preceding examples.

Still another exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a network element 500) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a memory; and
a processor operably coupled to the memory and configured to cause a network slice selection function (NSSF) of a cellular network to:
receive a network slice selection request associated with a non-access stratum (NAS) request by a user equipment device (UE), wherein the network slice selection request comprises a network slice identifier (NSID) indicating a UE-preferred network slice for the UE included in the NAS request;
select a network slice based on at least a network operator's policy, wherein to select the network slice the processor is configured to cause the NSSF to:
determine that the UE-preferred network slice is not compatible with a selection policy; and
select a network slice of the cellular network different from the UE-preferred network slice in response to the network slice selection request, wherein the selected network slice matches the selection policy; and
provide a network slice selection response, wherein the network slice selection response indicates the selected network slice, wherein the selected network slice is associated with a control plane entry point.

2. The apparatus of claim 1, wherein the network slice selection response includes an address for the associated control plane entry point.

3. The apparatus of claim 1,
wherein selecting the network slice is further based at least in part on information received from the UE by way of the network slice selection request and NAS request.

4. The apparatus of claim 1, wherein the processor is further configured to cause the NSSF to:
request user subscription information for the UE from a user subscription information repository of the cellular network; and
receive user subscription information for the UE from the user subscription information repository,
wherein selecting the network slice is based at least in part on the user subscription information received from the user subscription information repository.

5. The apparatus of claim 4, wherein the processor is further configured to cause the NSSF to:
store the user subscription information for the UE for at least a period of time in which the stored user subscription information is considered valid; and
perform network slice selections for the UE during the period of time in which the stored user subscription information is considered valid based at least in part on the stored user subscription information.

6. The apparatus of claim 1,
wherein the network slice selection request is received from a radio access network (RAN) node of the cellular network,
wherein the network slice selection response is provided to the RAN node of the cellular network,
wherein the NSSF does not process user plane data for the UE.

7. The apparatus of claim 1,
wherein the network slice selection response further indicates a selected set of control plane network functions associated with the selected network slice.

8. The apparatus of claim 1,
wherein the selected network slice comprises a radio access network (RAN) slice and a core network (CN) slice.

9. A non-transitory memory medium, comprising program instructions, wherein the program instructions are executable by a processing element and cause, when executed by the processing element, a network slice selection function (NSSF) of a cellular network to:
receive a network slice selection request associated with a non-access stratum (NAS) request received by a radio access network (RAN) node from a user equipment device (UE), wherein the network slice selection request comprises a network slice identifier (NSID)

indicating a UE-preferred network slice for the UE included in the NAS request;
select a network slice based on at least a network operator's policy, wherein to select the network slice the processing element is configured to cause the NSSF to:
determine that the UE-preferred network slice is not compatible with a selection policy; and
select a network slice of the cellular network different from the UE-preferred network slice in response to the network slice selection request, wherein the selected network slice matches the selection policy; and
provide a network slice selection response, wherein the network slice selection response indicates the selected network slice, wherein the selected network slice is associated with a control plane entry point.

10. The non-transitory memory medium of claim 9, wherein the network slice selection request comprises, for the NAS request, an indication of one or more of:
UE identification information;
service type information; or
application identification information.

11. The non-transitory memory medium of claim 9, wherein the program instructions are further executable to cause the NSSF to:
determine whether valid subscription information for the UE is stored by the NSSF; and
obtain subscription information for the UE from a home subscriber server (HSS) of the cellular network if valid subscription information for the UE is not stored by the NSSF,
wherein the network slice selection response indicates the control plane entry point for the network slice based at least in part on the subscription information for the UE.

12. The non-transitory memory medium of claim 9, wherein the selected network slice is also selected by the NSSF when the NAS request does not include a UE-preferred network slice.

13. The non-transitory memory medium of claim 9, wherein the program instructions are further executable to cause the NSSF to:
select a core network slice of the cellular network for the NAS request in response to the network slice selection request; and
select a RAN slice of the cellular network for the NAS request in response to the network slice selection request,
wherein the network slice selection response further indicates that the core network slice and the RAN slice are selected for the NAS request.

14. A method for managing a network slice selection function (NSSF) of a cellular network, the method comprising:
at the NSSF:
receiving a network slice selection request associated with a non-access stratum (NAS) request by a user equipment device (UE), wherein the network slice selection request comprises a network slice identifier (NSID) indicating a UE-preferred network slice for the UE;
selecting a network slice based on at least a network operator's policy, wherein selecting the network slice includes:
determining that the UE-preferred network slice is not compatible with a selection policy; and
selecting a network slice of the cellular network different from the UE-preferred network slice in response to the network slice selection request, wherein the selected network slice matches the selection policy; and
providing a network slice selection response, wherein the network slice selection response indicates the selected network slice, wherein the selected network slice is associated with a control plane entry point.

15. The method of claim 14,
wherein selecting the network slice is based at least in part on information received from the UE by way of the NAS request.

16. The method of claim 14, the method further comprising:
requesting user subscription information for the UE from a user subscription information repository of the cellular network; and
receiving user subscription information for the UE from the user subscription information repository,
wherein the selected network slice is selected based at least in part on the user subscription information received from the user subscription information repository.

17. The method of claim 16, the method further comprising:
storing the user subscription information for the UE for at least a period of time in which the stored user subscription information is considered valid; and
performing network slice selections for the UE during the period of time in which the stored user subscription information is considered valid based at least in part on the stored user subscription information.

18. The method of claim 14,
wherein the network slice selection response further indicates a selected set of control plane network functions associated with the selected network slice.

19. The method of claim 14,
wherein the selected network slice comprises a radio access network (RAN) slice and a core network (CN) slice.

20. The method of claim 14, the method comprising:
receiving a second network slice selection request associated with a second NAS request by a second UE, wherein the second NAS request does not include a UE-preferred network slice, wherein the selected network slice is also selected for the second UE in response to the second NAS request.

* * * * *